Jan. 27, 1925.
F. BUCK
FEELER GAUGE
Filed Jan. 3, 1922
1,524,474
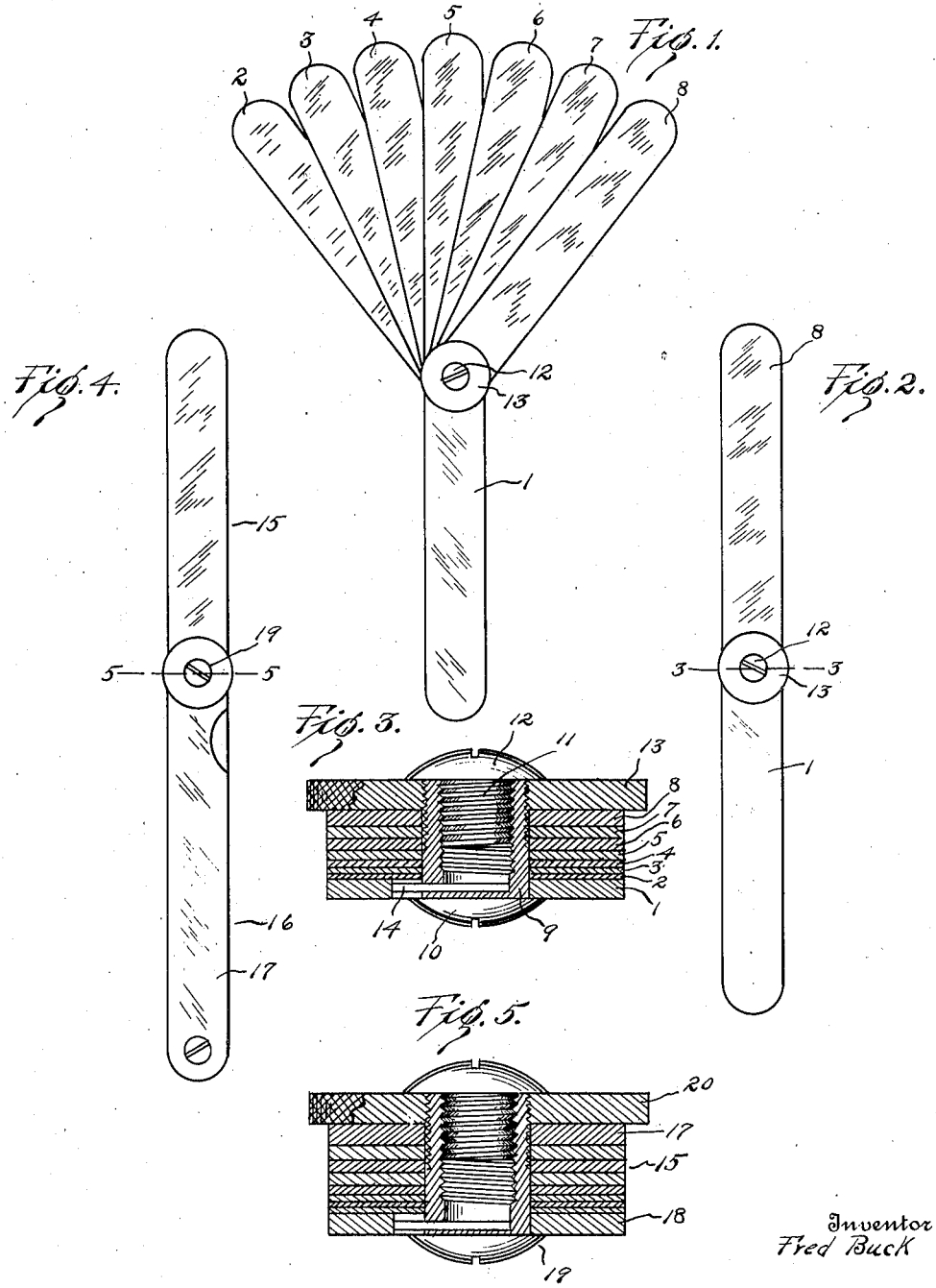

Patented Jan. 27, 1925.

1,524,474

UNITED STATES PATENT OFFICE.

FRED BUCK, OF SAGINAW, MICHIGAN, ASSIGNOR TO THE LUFKIN RULE COMPANY, OF SAGINAW, MICHIGAN, A CORPORATION OF MICHIGAN.

FEELER GAUGE.

Application filed January 3, 1922. Serial No. 526,530.

*To all whom it may concern:*

Be it known that I, FRED BUCK, a citizen of the United States of America, residing at Saginaw, in the county of Saginaw and State of Michigan, have invented certain new and useful Improvements in Feeler Gauges, of which the following is a specification, reference being had therein to the accompanying drawings.

The invention relates to gauges comprising a plurality of relatively rotatable leaves, such as thickness gauges, taper gauges, thread gauges, screw pitch gauges, fillet or radius gauges, and the like. The invention has for its object the provision of a gauge comprising a plurality of relatively rotatable leaves and provided with adjustable means for holding the leaves in their adjusted positions of rotation. Other objects of the invention reside in the novel features of construction as more fully hereinafter set forth.

In the drawings:

Figure 1 is a plan view of a gauge embodying my invention and showing the leaves in spread-out position;

Figure 2 is a similar view with one leaf in extended position;

Figure 3 is an enlarged cross section on the line 3—3 of Figure 2;

Figure 4 is a plan view of a modified construction of gauge showing one of the leaves in extended position;

Figure 5 is an enlarged cross section on the line 5—5 of Figure 4.

In the present instance, I have shown my invention as applied to thickness gauges, but it is apparent that the invention may be as readily applied to other gauges having a plurality of relatively rotatable leaves.

In the thickness gauge shown in Figures 1, 2, and 3, 1 is the case side and 2, 3, 4, 5, 6, 7 and 8 are the leaves which preferably progressively increase in thickness from the leaf 2 adjacent to the case side to the outer leaf 8.

The pivot for these leaves, which passes through one end thereof, comprises the internally and externally threaded screw 9 having the head 10, and the externally threaded screw 11 engaging the internal threads of the screw 9 and having the head 12, these heads being on opposite sides of the series of leaves.

To frictionally hold the leaves in their adjusted positions of rotation to facilitate the handling of the gauge in securing the proper spacing between two objects, there is the nut 13 threadedly engaging the screw 9 adjacent to the head 12 and adapted to abut the outer leaf 8 and force the series of leaves toward the head 10 of the screw 9, thereby cooperating with this head to frictionally hold the leaves in their adjusted positions of rotation. The nut 13 has a diameter slightly greater than the width of the leaves and also has a knurled periphery to facilitate its rotation.

To hold the screw 9 from rotation during rotation of the nut 13, this screw is nonrotatably secured to the case side 1 so that upon rotation of the nut 13, the screw 9 is prevented from rotating by holding the case side 1 stationary relative to the leaves. As shown in the present instance, the case side 1 has a small slot therein which is engaged by a suitable key 14 upon the screw 9.

In the modified construction shown in Figures 4 and 5, the thickness gauge has the series of leaves 15 similar to the series shown in Figures 1 and 2, and also the case 16 which comprises the two sides 17 and 18 spaced from each other and adapted to embrace the series of leaves 15 between them and to protect the same when not in use. The pivot 19 for the series of leaves passes through one end of the case as well as one end of the leaves and is nonrotatably secured to the side 18 of the case, as by being splined thereto, so that rotation of the nut 20 which is adjacent to the other side 17 of the case does not rotate the pivot, and consequently, cooperates with the case sides 17 and 18 to frictionally clamp the leaves in their positions of rotative adjustment.

While I have shown a case or case side for protecting the leaves of the gauge, it is obvious that the gauge may be made without a case or case side, in which event, the pivot will be nonrotatably secured to one of the leaves, this leaf being preferably of the greatest thickness.

What I claim as my invention is:

1. A device of the class described comprising a screw having a head and a socket, a plurality of relatively rotatable members mounted on said screw, a screw engaging the socket in the screw aforesaid and having a head, and means threadedly engaging the first-mentioned screw between the head of the last-mentioned screw and said relatively rotatable members and adapted to clamp said rotatable members against the head of the first-mentioned screw to hold the said rotatable members in adjusted position.

2. A device of the class described comprising an exteriorly threaded member having a head and a threaded socket, a plurality of relatively rotatable members mounted on said exteriorly threaded member, means securing one of said rotatable members to said head, an exteriorly threaded member engaging the threaded socket in the first-mentioned member and having a head, and a member threaded upon the first-mentioned member and disposed between the head of the last-mentioned member and said relatively rotatable members, the last-mentioned member being adapted to clamp said rotatable member against the head of the first-mentioned member to retain the said rotatable members in adjusted position.

In testimony whereof I affix my signature.

FRED BUCK.